United States Patent [19]

Clark

[11] 3,898,090

[45] Aug. 5, 1975

[54] FOUNDRY MOLD AND CORE COMPOSITIONS

[75] Inventor: Harold A. Clark, Midland, Mich.

[73] Assignee: Dow Corning Corporation, Midland, Mich.

[22] Filed: June 24, 1974

[21] Appl. No.: 482,299

[52] U.S. Cl......... 106/38.2; 106/38.35; 260/29.2 M
[51] Int. Cl. ........................ B28b 7/36; C04b 35/14
[58] Field of Search... 106/38.2; 260/37 SB, 46.5 R, 260/29.2 M, 38.35

[56] References Cited

UNITED STATES PATENTS 2,786,042    3/1957    Iler.................................. 260/46.5 R

*Primary Examiner*—Theodore Morris
*Attorney, Agent, or Firm*—Norman E. Lewis

[57] ABSTRACT

A binder composition for foundry aggregates is obtained from the dispersion of colloidal silica in a matrix of silsesquioxane, the major portion of which is $CH_3SiO_{3/2}$.

12 Claims, No Drawings

FOUNDRY MOLD AND CORE COMPOSITIONS

BACKGROUND OF THE INVENTION

The present invention relates to foundry mold and core compositions. In one aspect, the invention relates to a method of preparing compositions useful in the fabrication of foundry shapes.

In the foundry art, molds and cores for use in making metal castings are generally prepared from a refractory aggregate, such as sand, which is bonded together with a polymerizable or curable binder material. The binder is mixed with the aggregate and any auxiliary materials and this foundry mix is molded to the desired shape and thereafter cured to provide a coherent or self-supporting structure. Furan resins and organosilicate solutions are the most widely used binder resins. Certain silicone polymers have also been suggested for use as foundry binders — see U.S. Pat. No. 3,093,494 and U.S. Pat. No. 3,432,312.

The present invention provides a relatively inexpensive silicone-containing foundry binder which has the additional advantages of being substantially nongassing when contacted with molten metals.

Thus, it is an object of the present invention to provide novel mold and core compositions for the fabrication of foundry shapes. Another object of the invention is to provide a method of preparing compositions useful in making molds and cores. These and other objects of the present invention will be apparent to one skilled in the art upon consideration of the following disclosure and appended claims.

DETAILED DESCRIPTION OF THE INVENTION

In accordance with the present invention there is provided a refractory mold and core composition for the fabrication of foundry shapes which comprises a major amount of foundry aggregate coherently bonded by an effective bonding amount of up to about 20 weight percent of a binder composition consisting essentially of 10 to 75 weight percent colloidal silica uniformly dispersed in a matrix of 25 to 90 weight percent $RSiO_{3/2}$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical and the gamma-methacryloxypropyl radical, at least 70 weight percent of the matrix being $CH_3SiO_{3/2}$.

Further in accordance with the present invention there is provided a method of preparing molds and cores for the casting of metals comprising (a) mixing a major amount of foundry aggregate with a binder composition consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said binder composition containing from 15 to 60 weight percent solids consisting essentially of 10 to 75 weight percent colloidal silica and 25 to 90 weight percent of the partial condensate, said composition containing sufficient acid to provide a pH in the range of 3.0 to 6.0; (b) forming the mixture into the desired shape (c) drying the shaped article to remove at least the major portion of the binder solvent, (d) thereafter curing the partial condensate portion of the binder.

The binder composition utilized in the above-described method is a solution dispersion containing from about 15 to 60 weight percent solids based on the weight of colloidal silica and the partial condensate present in the binder. The major portion of the partial condensate is that of $CH_3Si(OH)_3$; a minor amount (30% or less) of the siloxanol being obtained from cocondensation with $C_2H_5Si(OH)_3$, $C_2H_7Si(OH)_3$, $CH_2=CHSi(OH)_3$,

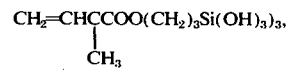

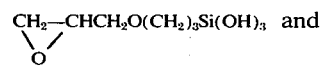 and mixtures thereof. From both the standpoint of economy and avoidance of gassing in the cured binder, it is preferred to utilize all monomethyltrisilanol in formulating the vehicle. The presence of at least 70 weight percent $CH_3SiO_{3/2}$ in the siloxane component of the composition provides a binder of low organic content. Reduction of the organic content of the resin is a major factor in minimizing the formation of gases during casting operations.

The trisilanols, $RSi(OH)_3$, are generated in situ by adding the corresponding trialkoxysilanes to an acidic aqueous dispersion of colloidal silica. Exemplary trialkoxysilanes are those containing methoxy, ethoxy, isopropoxy and t-butoxy substituents which upon hydrolysis liberate the corresponding alcohol; thus, generating at least a portion of the alcohol present in the fluid binder. Upon generation of the silanol in the acidic aqueous medium, there is condensation of the hydroxyl substituents to form —Si—O—Si— bonding. The condensation takes place over a period of time and is not complete, but rather, the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three —SiOSi— units. During curing of the binder, these residual hydroxyls condense to provide a silsesquioxane, $RSiO_{3/2}$.

The silica component of the composition is present as colloidal silica. Aqueous dispersions generally contain colloidal silica having a particle diameter size in the range of 5 to 150 millimicrons. These silica hydrosols are prepared by methods well-known in the art and are commercially available under such registered trademarks as "Ludox" and "Nalcoag". It is preferred to use colloidal silica of 15–60 millimicron particle size in order to provide greater shelf life in the binder composition. Colloidal silicas of this type are relatively free of $Na_2O$ and other metal oxides, generally containing less than 2 weight percent and preferably less than 1 weight percent $Na_2O$. These silicas are available as both acidic and basic hydrosols. Colloidal silica is to be distinguished from other water dispersible forms of $SiO_2$, such as polysilicic acid or alkali metal silicates which are not within the scope of the present invention.

The binder consists of silica dispersed in a solution of the siloxanol in a lower aliphatic alcohol-water cosolvent. Suitable lower aliphatic alcohols are water miscible and include methanol, ethanol, isopropanol and t-butanol. Of course mixtures of such alcohols can be utilized. Isopropanol is the preferred alcohol and when mixtures of alcohol are used, it is preferred that at least 50 weight percent of isopropanol be present in such mixture. The solvent system should contain from about 20 to 65 weight percent alcohol to ensure solubility of the siloxanol. Optionally minor amounts (no more than 20 weight percent) of a water-miscible polar solvent, such as acetone, butyl cellosolve and the like, can be present in the cosolvent system.

To provide shelf life and minimize gellation in the binder composition, sufficient inorganic or water-miscible organic acid to provide a pH of from 3.0 to 6.0 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf life and require less ageing to obtain the described soluble partial condensate. It is preferred to add sufficient water-miscible carboxylic acid selected from the group consisting of acetic, formic, propionic and maleic acids to provide pH in the range of 4 to 5.5 in the binder composition. In addition to providing good shelf life, the alkali metal salts of these acids are soluble, thus allowing the use of these acids with silicas containing a substantial (greater than 0.2% $Na_2O$) amount of alkali metal or metal oxide.

The binder is easily prepared by adding trialkoxysilanes, such as $RSi(OCH_3)_3$, to colloidal silica dispersion after adjusting the pH of the dispersion to the desired level by addition of the acid, or the acid can be added to either the silane or the hydrosol prior to mixing the two components, provided that the mixing is done rapidly. The amount of acid necessary to obtain the desired pH will vary with the alkali metal content of the silica but is usually less than one weight percent of the composition. Alcohol is generated by hydrolysis of the silicon-bonded alkoxy substituents, for example, hydrolysis of one mole of $—Si(OC_2H_5)_3$ generates three moles of ethanol. Depending upon the percent solids desired in the final composition, additional alcohol, water or a water-miscible solvent can be added. The binder composition should be well mixed and allowed to age for a short period of time to ensure formation of the partial condensate. The composition thus obtained is a clear or slightly hazy low viscosity dispersion which is stable for several days. The condensation of $≡SiOH$ continues at a very slow rate and the composition will eventually form gel structures. The life of the composition can be extended by maintaining the dispersion at below room temperature, for example at 40°F.

Buffered latent condensation catalysts can be added to the composition so that milder curing conditions can be utilized to obtain the optimum properties in the final coating. Alakli metal salts of carboxylic acids, such as potassium formate, are one class of such latent catalysts. The amine carboxylates and quaternary ammonium carboxylates are another such class of latent catalysts. Of course, the catalysts must be soluble or at least miscible in the cosolvent system. The catalysts are latent to the extent that at room temperature they do not appreciably shorten the bath life of the composition, but upon heating the catalyst dissociates and generates a catalytic species active to promote condensation, for example an amine. Buffered catalysts are used to avoid effects on the pH of the composition. Certain of the commercially available colloidal silica dispersions contain free alkali metal which reacts with the organic acid during the adjustment of pH to generate the carboxylate catalyst in situ. This is particularly true when starting with a hydrosol having a pH of 8 or 9. The binder can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but above about 1.5 weight percent catalyst in the vehicle, the shelf life is shortened and the physical properties of the resin may be impaired. It is preferred to utilize from about 0.05 to 1 weight percent of the catalyst.

To provide the greatest stability in the dispersion while obtaining optimum properties in the cured binder, it is preferred to utilize a binder composition having a pH in the range of 4–5 which contains 15 to 60 weight percent solids; the silica portion having a particle size in the range of 10–60 millimicrons; the partial condensate of $CH_3Si(OH)_3$ being present in an amount in the range of 35 to 65 weight percent of the total solids in a cosolvent of methanol, isopropanol and water, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a vehicle is relatively stable, having a shelf life of approximately one month.

The foundry aggregates utilized to prepare the mold and core compositions are conventional refractory substances in finely-divided particulate form. Sand is most commonly used. Other materials include finely divided silica, such as silica flour, ground glass, fireclay grog, zirconium silicate, calcined kyanite, and alumina. Mixtures of aggregate, such as sand and silica flour, can be used if desired. A preferred mixture consists of approximately equal amounts of 50 to 100 mesh (Tyler Standard) sand and −200 mesh (Tyler Standard) silica flour. It is apparent that any finely divided refractory material which is inactive with respect to the metal to be cast and which melts above the casting temperature can be employed in the practice of the invention.

The foundry aggregate can be mixed with the binder composition in any suitable manner. The amount of liquid binder composition coated onto or slurried with the aggregate will vary with the percent solids in the binder composition, the molding technique to be utilized and the optimum amount necessary to obtain the desired strength in the cured article. Addition of 5 to 75 parts binder per 100 parts aggregate will provide an effective bonding amount (up to about 20 percent) of the $SiO_2/RSiO_{3/2}$ material in the cured mold or core. The uncured binder-aggregate mixture can be formed to the desired shape by conventional techniques, such as by ramming or blowing a relatively dry mixture into a pattern or by pouring a slurry about a pattern. Shell molds can be produced by dipping a wax pattern in a slurry of the binder-aggregate mixture.

After the forming operation, the uncured shaped article is dried at room temperature or slightly elevated temperatures, for example 50° to 80°C., to remove a major portion of the alcohol-water cosolvent. Optimum strengths are obtained when substantially all of the cosolvents are removed prior to curing. The binder is cured by maintaining the shaped article at elevated temperatures sufficient to result in condensation of residual hydroxyl group attached to the siloxanol polymer. Complete curing results in the formation of a silsesquioxane of the formula $RSiO_{3/2}$, it being understood that a minor amount (generally less than 5 weight percent) of $\equiv$ SiOH groups remain. Curing at from 100° to 150°C. is sufficient to provide a shaped article which is coherent and self supporting. The shaped article so obtained is composed of foundry aggregate which is bonded together with an effective amount (up to about 20 weight percent based on the weight of aggregate) of the binder which is colloidal silica uniformly dispersed in a matrix of $RSiO_{3/2}$. The colloidal silica is distinct from other forms of silica which may be in the refractory foundry aggregate. The colloidal silica portion comprises 10 to 75 weight percent of the binder while the silsesquioxane comprises the remainder, 25 to 90 weight percent. It is preferred that the $RSiO_{3/2}$ portion be a monomethylsilsesquioxane and that it comprise 35 to 65 weight percent of the binder. After curing, the article can be further heated or fired to obtain ceramification of the material.

The following examples are illustrative but not intended as limiting of the invention delineated in the claims.

EXAMPLE 1

Glacial acetic acid (0.2 gram) was added to ten grams of a 30% solids aqueous dispersion of 13–14 millimicron sized colloidal silica which had an $Na_2O$ content of about 0.32 weight percent and pH of 9.8. After acidification (pH of 4.5) six grams of methyltrimethoxysilane were stirred into the aqueous dispersion. The mixture was stirred for approximately 30 minutes to ensure completion of hydrolysis and partial condensation. This binder composition contained 36 percent solids (half of which was colloidal silica) in a methanol-water solution dispersion. Sodium acetate, a condensation catalyst, was generated by the addition of the acid.

A second binder composition equivalent to the above was prepared except that the aqueous dispersion of colloidal silica had an $Na_2O$ content of less than 0.05 weight percent. After hydrolysis and partial condensation of the silane, the composition was diluted to 25% solids by addition of isopropanol and catalyzed by addition of 0.25 weight percent benzyltrimethylammonium acetate.

A third binder composition was prepared by using glacial acetic acid to acidify a 50% solids aqueous dispersion of 50 to 60 millimicron colloidal silica having an $Na_2O$ content of about 0.1 weight percent and then adding sufficient methyltrimethoxysilane to provide a 50/50 mixture of colloidal silica and partial condensate (calculated as the weight of $CH_3SiO_{3/2}$). After about one hour's mixing the composition was diluted to 19% solids with a 50/50 isopropanol/water mixture. Sufficient benzyltrimethylammonium acetate to provide 0.25 weight percent of the catalyst was then added.

A fourth composition, equivalent to the third binder at 19% solids was prepared but left uncatalyzed.

These binder compositions were used to wet standard white foundry sand which was then tamped into dog bone tensile bar molds. Sufficient of the liquid compositions were added to the foundry sand to provide 3 to 6 parts $SiO_2/CH_3SiO_{3/2}$ binder per 100 parts sand. These shaped articles were dried overnight at 50°C. and then cured at 1½ hours at 100°C. Tensile strengths were determined. Results are tabulated below:

| Binder Composition | Parts Binder/ 100 parts Sand | Tensile Strength (psi) |
|---|---|---|
| No. 1 | 6 | 21 |
| No. 2 | 4 | 63 |
| No. 3 | 3 | 46 |
| No. 4 | 6 | 248 |

After sample No. 2 was broken, half was retained in a 200°C. oven for 24 hours, then a 350°C. oven for an additional 24 hours. There was no indication of change in the material. The sample was then fired through a ceramification to a maximum temperature of 1950°F. The ceramified material held its shape which is surprising considering the small amount of binder and relatively large particle size of the sand.

EXAMPLE 2

The first binder composition described in Example 1 was utilized to prepare mixtures containing various amounts of binder solids. After ageing for 24 hours, amounts sufficient to provide the desired concentration of binder solids were added to portions of 50 to 100 mesh fused silica sand and thoroughly blended in a low shear mixer. The sand-binder mixtures were packed into tensile bar molds. In one instance half of the coarse sand was replaced with −425 mesh (Tyler standard) silica flour. The shaped articles were dried at 50°C. for about 72 hours before curing at 125°C. for one hour. Five tensile bars were made from each mixture. After curing, two of the bars from each mixture were fired at 1200°F. for four hours. Tensile strengths were determined and are tabulated below:

| Gms. Cured Binder Per 100 gms. Aggregate | Tensile Strength (p.s.i.) | |
|---|---|---|
| | Cured | Fired |
| 1.5 | 37.5 | 17 |
| 3.0 | 71.8 | 14.5 |
| 6.0 | 54.6 | 14.5 |
| 12.0 | 33.8 | 14.5 |
| 7.6* | 193 | 328 |

*aggregate was 50% 50–100 mesh sand and 50% −425 mesh silica flour.

A similar binder composition containing 70 weight percent $CH_3SiO_{3/2}$ based on the total solids was mixed with sufficient sand to provide 3 grams binder per 100 grams sand, dried for 24 hours at 50°C. then cured for one hour at 125°C. to yield an article having a tensile strength of 85 p.s.i.

EXAMPLE 3

One hundred and sixty-two grams of a composition equivalent to the first described in Example 1 was mixed with 420 grams of −425 mesh silica flour while stirring at low speed in a Waring blender. A small amount (about 30 grams) of isopropanol was added to produce a slurry suitable for producing shell molds by the lost wax process.

A shell mold was built up by dipping a wax replica of a turbine blade into the slurry; upon removal, sprinkling the adhering slurry with a layer of the previously described coarse sand; air drying for about 30 minutes and then repeating the procedure. Seven layers were built up in this fashion. The final layer of slurry was not coated with sand. After air drying for about 16 hours, the wax was melted out. The resultant mold was preheated by holding it in a pot of molten lead and then filled with molten lead. The filled mold was removed from the pot, allowed to cool and then broken away from the casting.

When the slurry had aged for 4 days, a second shell mold of different shape was produced in the same manner. After breaking the mold away from the casting, a fragment of the bonded aggregate was repeatedly heated red hot and plunged into cold water without fracturing.

Reasonable modification and variation are within the scope of the invention which is directed to novel foundry core and mold compositions and to a method of preparing articles from such compositions.

That which is claimed is:

1. A refractory mold and core composition for the fabrication of foundry shapes which comprises a major amount of foundry aggregate coherently bonded by an effective bonding amount of up to about 20 weight percent of a binder composition consisting essentially of 10 to 75 weight percent colloidal silica uniformly dispersed in a matrix of 25 to 90 weight percent $RSiO_{3/2}$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the matrix being $CH_3SiO_{3/2}$.

2. A composition in accordance with claim 1 wherein the matrix consists of $CH_3SiO_{3/2}$.

3. A composition in accordance with claim 2 wherein the foundry aggregate is sand.

4. A composition in accordance with claim 2 wherein the foundry aggregate comprises a mixture of sand and silica flour particles of less than 200 mesh (Tyler Standard).

5. A method of preparing molds and cores for the casting of metals comprising
   a. mixing a major amount of foundry aggregate with a binder composition consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3,-trifluoropropyl radical, the gamma-glycidoxypropyl radical and the gamma-methacryloxypropyl radical, at least 70 weight percent of the silanol being $CH_3Si(OH)_3$, said binder composition containing from 15 to 60 weight percent solids consisting essentially of 10 to 75 weight percent colloidal silica and 25 to 90 weight percent of the partial condensate, said composition containing sufficient acid to provide a pH in the range of 3.0 to 6.0;
   b. forming the mixture into the desired shape
   c. drying the shaped article to remove at least the major portion of the binder solvent,
   d. thereafter curing the partial condensate portion of the binder.

6. A method in accordance with claim 5 wherein the curing is effected at elevated temperatures.

7. A method in accordance with claim 6 wherein the partial condensate is that of $CH_3Si(OH)_3$.

8. A method in accordance with claim 7 wherein the binder composition contains from 0.1 to 1.5 weight percent of a buffered latent silanol condensation catalyst.

9. A method in accordance with claim 8 wherein the catalyst is an alkali metal salt of a carboxylic acid.

10. A method in accordance with claim 9 wherein the catalyst is sodium acetate.

11. A method in accordance with claim 5 wherein the acid is a carboxylic acid selected from the group consisting of acetic acid, formic acid, propionic acid and maleic acid.

12. A method in accordance with claim 5 wherein 15 to 75 parts by weight of the binder composition is mixed with 100 parts by weight of the foundry aggregate.

* * * * *